United States Patent
Fenton

(10) Patent No.: US 7,523,916 B2
(45) Date of Patent: Apr. 28, 2009

(54) FAIL-SAFE GATE VALVE

(75) Inventor: Stephen P. Fenton, Balmedie (GB)

(73) Assignee: Vetco Gray Inc., Houston, TX (US)

( * ) Notice: Subject to any disclaimer, the term of this patent is extended or adjusted under 35 U.S.C. 154(b) by 186 days.

(21) Appl. No.: 11/543,378

(22) Filed: Oct. 5, 2006

(65) Prior Publication Data

US 2008/0083892 A1    Apr. 10, 2008

(51) Int. Cl.
*F16K 35/00*    (2006.01)

(52) U.S. Cl. .................. 251/94; 251/326; 251/266; 251/274

(58) Field of Classification Search .................. 251/68, 251/266–267, 274, 275, 276, 277, 278, 326–329, 251/89, 94
See application file for complete search history.

(56) References Cited

U.S. PATENT DOCUMENTS

| | | | |
|---|---|---|---|
| 2,738,684 A | 3/1956 | Shafer | |
| 2,780,233 A | 2/1957 | Volpin | |
| 3,770,247 A | 11/1973 | Nelson | |
| 3,989,223 A * | 11/1976 | Burkhardt et al. | ............. 251/58 |
| 4,029,294 A | 6/1977 | McCaskill et al. | |
| 4,373,700 A | 2/1983 | Buchta | |
| 4,429,592 A | 2/1984 | Stevenson | |
| 4,433,827 A * | 2/1984 | Redmon et al. | ............. 251/191 |
| 4,479,397 A | 10/1984 | Jelinek et al. | |
| 4,541,608 A * | 9/1985 | Forester et al. | ................ 251/77 |
| 4,683,767 A | 8/1987 | Weyer | |
| 5,046,376 A * | 9/1991 | Baker | ........................ 74/89.39 |
| 5,195,721 A | 3/1993 | Akkerman | |
| 5,203,222 A | 4/1993 | Hirai | |
| 5,261,446 A * | 11/1993 | Baker | ......................... 137/458 |
| 5,620,166 A | 4/1997 | Lord et al. | |
| 5,832,779 A | 11/1998 | Madrid et al. | |
| 5,865,272 A | 2/1999 | Wiggins et al. | |
| 5,983,743 A | 11/1999 | McGregor et al. | |
| 6,276,135 B1 * | 8/2001 | Ellett | .......................... 60/477 |
| 6,446,519 B1 | 9/2002 | Biester | |
| 6,488,260 B1 | 12/2002 | Dietz | |
| 6,585,227 B2 | 7/2003 | Newport et al. | |
| 6,684,897 B2 * | 2/2004 | Sundararajan | ........... 137/15.19 |
| 6,840,494 B2 * | 1/2005 | Cunningham | ................. 251/62 |
| 6,942,192 B2 * | 9/2005 | Cunningham | ................. 251/62 |
| 2003/0038266 A1 * | 2/2003 | Hallden et al. | ............... 251/266 |

FOREIGN PATENT DOCUMENTS

GB    2425819 A    11/2006

* cited by examiner

*Primary Examiner*—John Rivell
*Assistant Examiner*—Marina Tietjen
(74) *Attorney, Agent, or Firm*—Bracewell & Giuliani

(57) ABSTRACT

A gate valve has a body with a gate chamber intersected by a flow passage and a stem chamber extending from the gate chamber. A gate is carried in the gate chamber. A stem, when rotated, causes linear movement of the gate between open and closed positions. A neck on the gate extends into the stem portion of the chamber. The neck has a cylindrical outer diameter, and a seal seals the neck to the stem portion of the chamber. The stem extends into engagement with a cavity in the neck. A ball screw interface is located between the stem and the cavity of the neck.

17 Claims, 4 Drawing Sheets

FAIL-SAFE GATE VALVE

FIELD OF THE INVENTION

This invention relates in general to gate valves for oil and gas production, and in particular to a gate valve that closes automatically in the event of loss of a control signal.

BACKGROUND OF THE INVENTION

A gate valve has a body with a central chamber that is intersected by a flow passage. A gate moves within the chamber between the open and closed positions. The gate has a hole through it that aligns with the flow passage while in the open position. The gate may be of a split type, comprising two halves or it may comprise a single slab. A stem extends into engagement with the gate for moving the gate between open and closed positions. The chamber has a central portion, which is intersected by the flow passages, and a stem portion that extends from the central portion. Typically, a seal in the stem portion of the chamber engages the stem to seal pressure within the chamber.

In one type, the stem extends into rotatable engagement with a threaded nut or sleeve secured to the gate. Rotating the stem causes the gate to move linearly. In another type, the stem does not rotate. A threaded nut sleeve mounted in the bonnet of the valve engages the stem, and when rotated, causes the stem to move linearly. The threads of the sleeves and stem may slide against each other, or they may employ balls between the grooves for reducing friction.

Gate valves may be operated manually, such as with a wheel mounted to the stem or the nut sleeve. It is also known to utilize a remote operated vehicle (ROV) to engage and rotate a stem or nut sleeve. Hydraulically powered actuators are also utilized wherein a piston moves the stem linearly without rotation. Electrical actuators are also known that employ an electrical motor and a gear train to rotate a stem or nut sleeve to cause movement of the gate.

With actuators, typically, a spring is used to return the gate to a fail-safe position if power is lost. The fail-safe position could be either an open or a closed position. In a subsea environment using a hydraulic actuator, the spring must be strong enough to overcome hydrostatic pressure when pushing the piston back, requiring accommodation of relatively high loads and adversely impacting the physical size (and weight) of the actuator accordingly.

SUMMARY OF THE INVENTION

In this invention, the gate valve has a gate with a neck formed on it with a cylindrical outer diameter. The neck extends into a cylindrical stem portion of the chamber. A seal seals around the neck to seal fluid pressure in the central portion of the chamber from the stem portion of the chamber. A rotatable member, such as a stem, extends into the stem portion of the chamber on the opposite side of the seal. The stem and the neck have an interface for effecting movement of the gate between open and closed positions in response to rotation of the stem. The seal prevents any fluid in the central portion of the chamber from contacting the interface.

Preferably the stem has an inner end extending into a cavity in the neck. The outer end of the stem preferably extends to the exterior of the body for rotation by an operator, either manual or an ROV. Preferably the stem is non-rising relative to the body and the interface comprises a ball thread device with very low friction. The neck on the gate and the seal define a pressure area that is sized to exert a force in a fail-safe direction in response to the fluid pressure in the flow line. If subsea, the pressure in the stem portion of the chamber is normally the same as the hydrostatic pressure of the sea. The pressure area is selected so that a nominal pressure differential across the neck seal will cause movement of the gate to the fail-safe position. To prevent the gate from moving to the fail-safe position during normal operation, a clutch engages the stem and prevents it from rotating. The clutch is controlled by a pilot signal from a controller, which is supplied with power, either hydraulic or electrical. Upon loss of the pilot signal, the clutch disengages, allowing the stem to rotate and the gate to move to the fail-safe position.

DETAILED DESCRIPTION OF THE INVENTION

Figure 1:
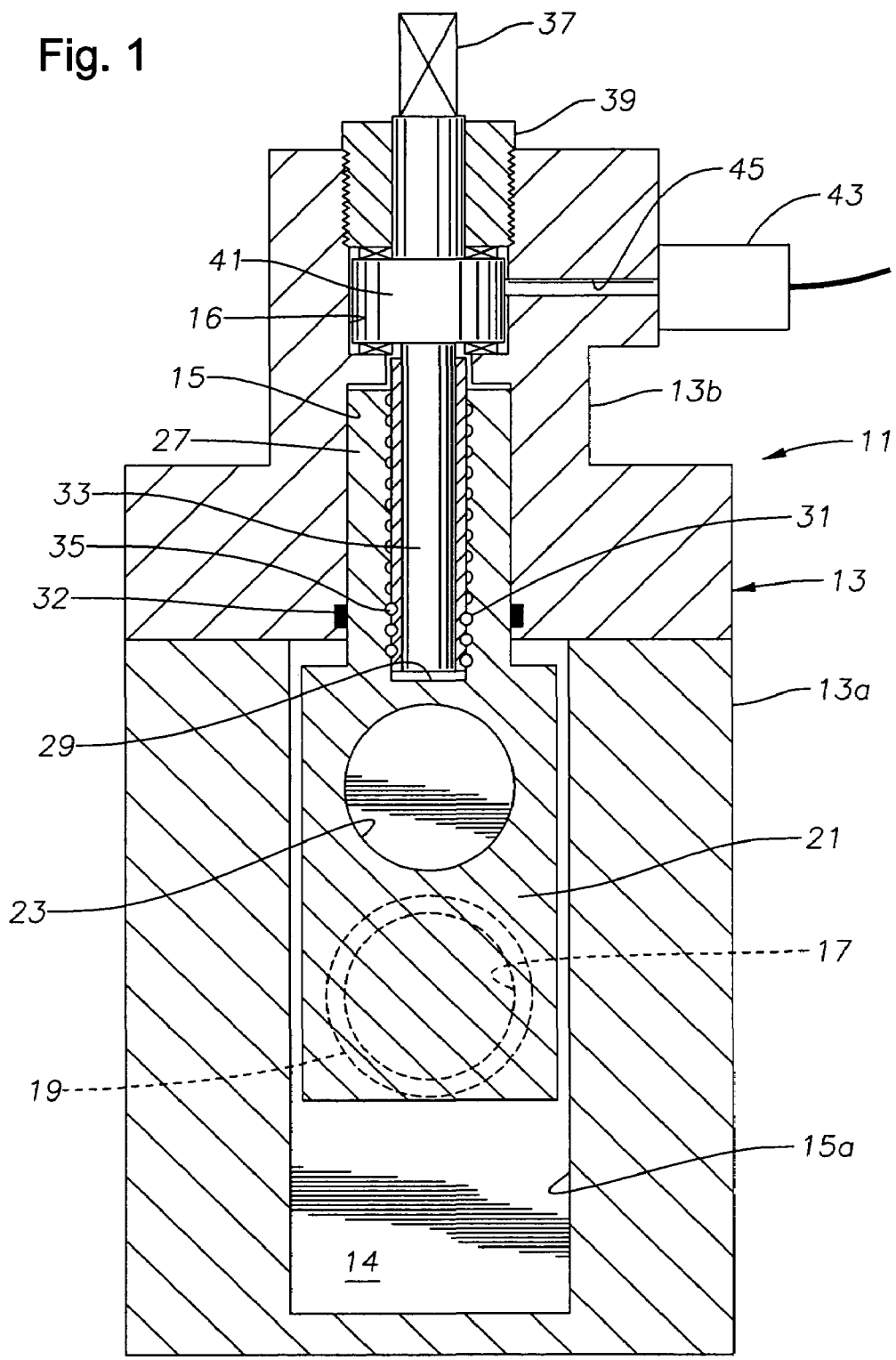
FIG. 1 is a schematic sectional view illustrating a gate valve constructed in accordance with this invention and shown in a closed position.

Referring to FIG. 1, gate valve 11 has a body 13. Body 13 typically comprises a flow line portion 13a and a bonnet 13b that are bolted together. A gate chamber 14 is located in flowline portion 13a. A stem chamber 15 in bonnet 13b extends from gate chamber 15, and a clutch chamber 16 in bonnet 13b extends above stem chamber 15. Gate chamber 14 has flat sides 15a that face each other, and stem chamber 15 is cylindrical. Clutch chamber 16 may be cylindrical or other shapes and is shown larger in diameter than stem chamber 15.

Figure 2:
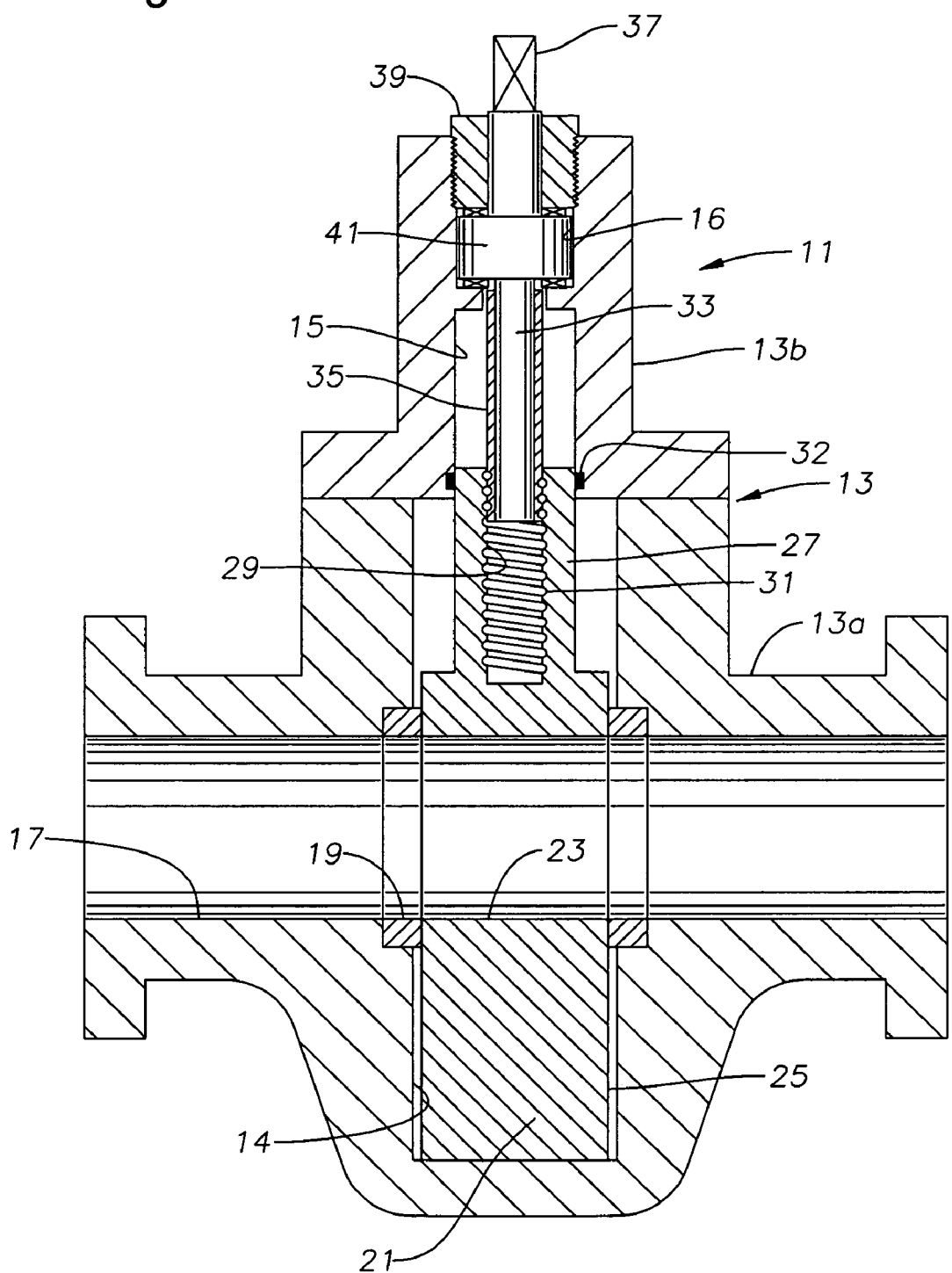
FIG. 2 is a sectional view of the gate valve of FIG. 1, taken along the line 2-2, but showing the gate in an open position.

Referring to FIG. 2, a flow passage 17 extends through body 13 and intersects gate chamber 14. A seat ring 19 is located at each intersection of flow passage 17 with gate chamber 14. Seat rings 19 are typically metal rings having seal surfaces on their inner faces.

Figure 4:
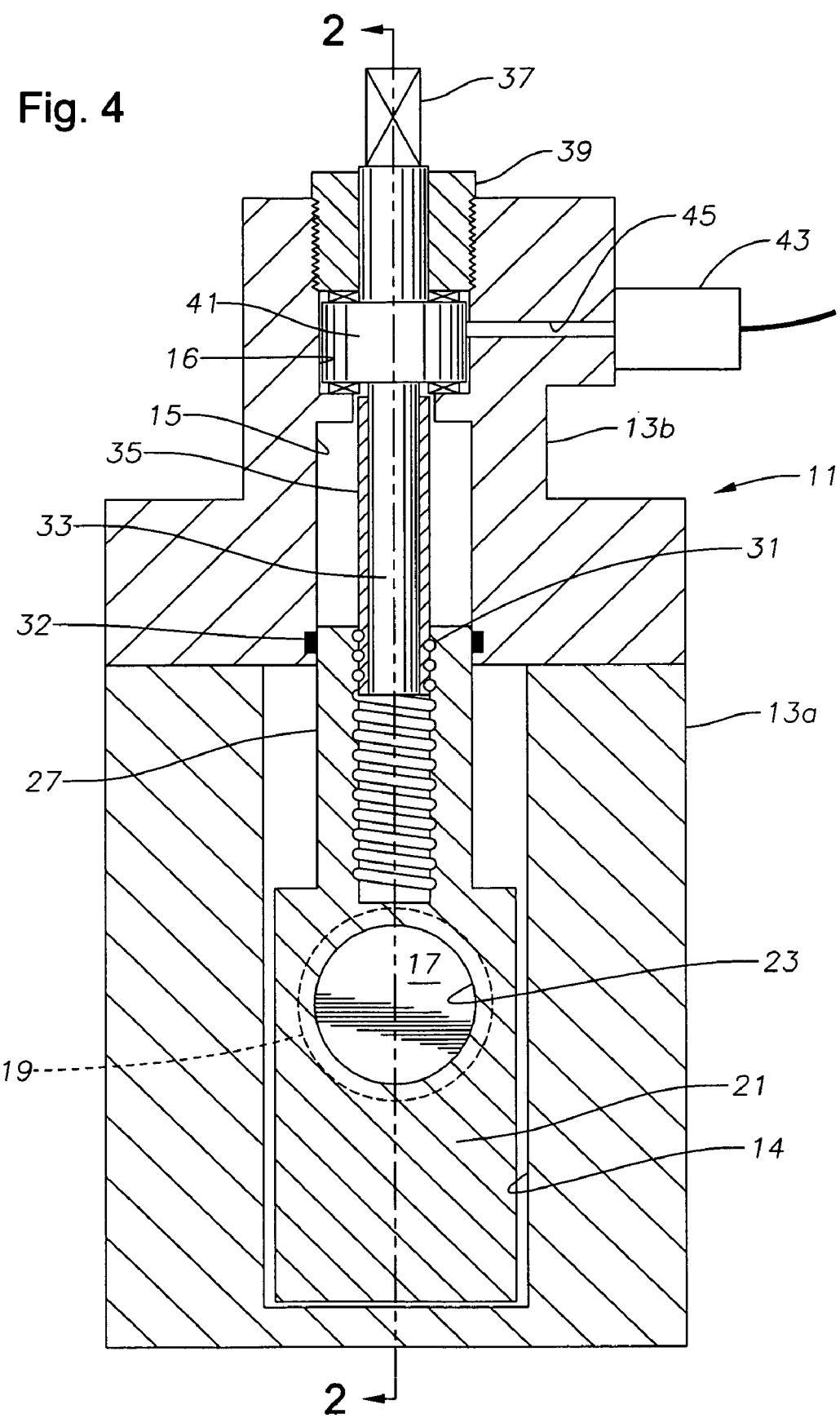
FIG. 4 is a schematic sectional view of the gate valve of FIG. 1, but showing the gate in an open position.

A gate 21 moves linearly within gate chamber 14 between the open position of FIGS. 2 and 4 and the closed position of FIG. 1. Gate 21 has a hole 23 through it that is sized to register with flow passage 17 while in the open position. Gate 21 has oppositely facing flat faces 25 for sealingly engaging seat rings 19. Seat rings 19 may be biased by springs against flat faces 25. The face 25 that seals will be a downstream side, thus the sealing engagement depends on the direction of flow through flow passage 17. Gate 21 comprises a single slab in this embodiment, as opposed to a split slab type gate.

Figure 3:
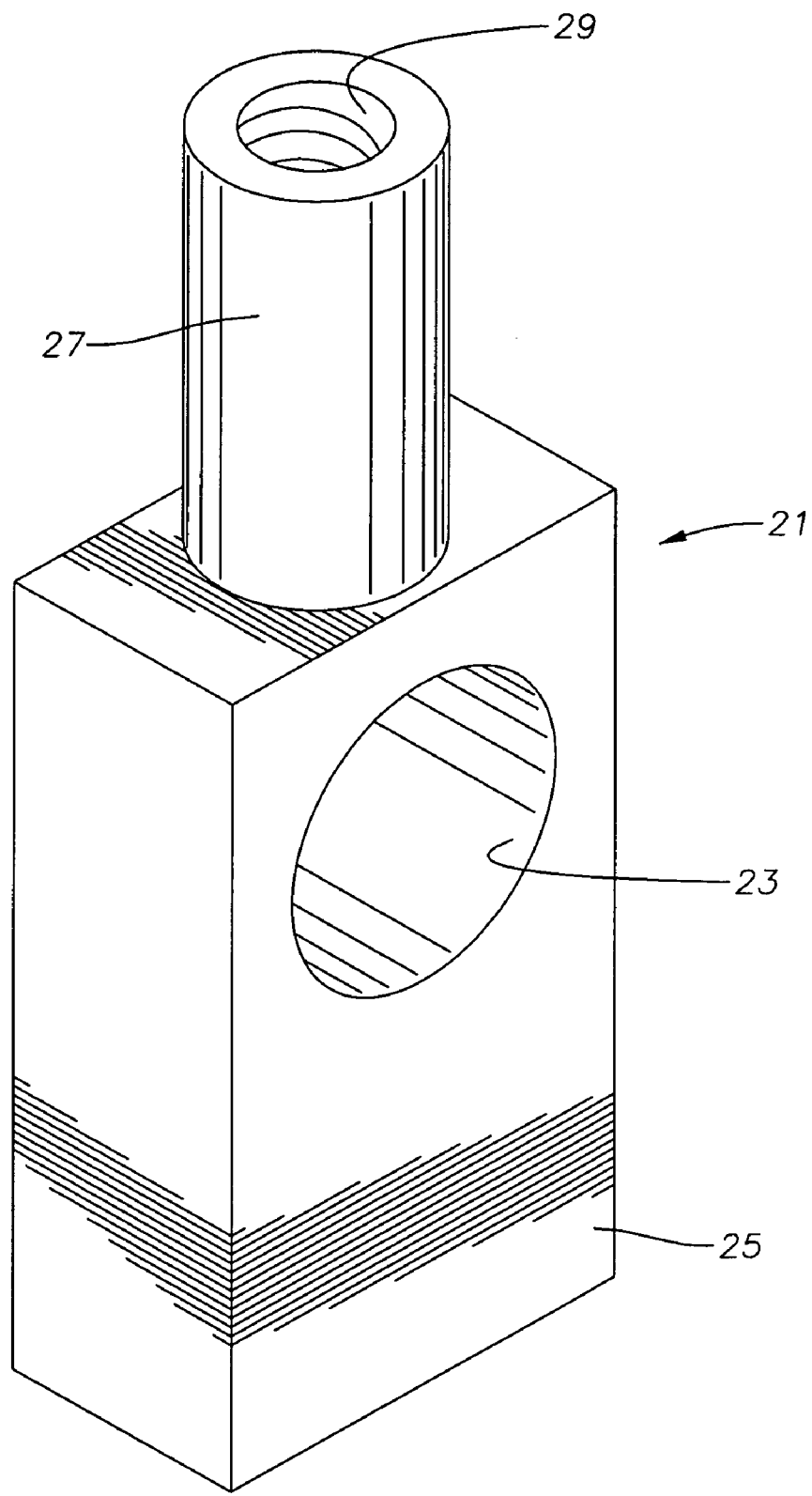
FIG. 3 is an isometric view of the gate of the gate valve of FIG. 1, shown removed from the body of the valve.

Gate 21 has a cylindrical neck 27, which is best illustrated in FIG. 3. Neck 27 extends upward from gate 21 within stem chamber 15 and has a cylindrical outer diameter. In this embodiment, neck 27 has a diameter that is approximately equal to the distance from one flat face 25 to the other, substantially equaling the thickness of gate 21, but the diameter could differ. The width of gate 21 measured between its side edges is somewhat larger than the diameter of neck 27 in this embodiment. Neck 27 also has a length that is at least equal to the length of the stroke of gate 21 from the closed to the open position Neck 27 has a stem cavity or receptacle 29 located within it. Stem cavity 29 is a cylindrical hole formed on the axis of neck 27 with a depth at least equal to the length of the stroke of gate 21 from the closed to the open position. In the preferred embodiment, the bottom of stem cavity 29 is located at the base of neck 27. A neck seal 32 seals between the outer diameter of neck 27 and the inner diameter of stem chamber 15. Seal 32 is preferably located within bonnet 13b near the junction of stem chamber 15 with gate chamber 14. In this embodiment, seal 32 is located in an annular recess formed in stem chamber 15.

A rotatable member engages neck 27 to cause linear movement of gate 21 in response to rotational movement of the rotatable member. In this embodiment, the rotatable member comprises a stem 33 that extends into stem cavity 29 of neck 27. An interface device, comprising a ball screw 35 in this embodiment, is located between stem cavity 29 and stem 33 to provide a low friction means for translating rotary motion of stem 33 to linear motion of gate 21 and vice-versa. Ball screw 35 may be any conventional type having a plurality of balls located between mating helical grooves 31. Fluid located in gate chamber 14 is sealed from ball screw 35 by gate neck seal 32. Stem 33 is a non-rising type in this embodiment, thus rotates only and does not move along its axis.

Stem chamber 15 is preferably filled with a liquid lubricant. If gate valve 11 is a subsea valve, means will be employed for equalizing the pressure of the lubricant in stem chamber 15 with the hydrostatic pressure of the sea. For example, a passage (not shown) may lead from stem chamber 15 to the exterior of bonnet 13b for connection to a line leading to an accumulator (not shown). The accumulator would have a bladder in contact with sea water on one side and the lubricant on the other side to maintain the pressure of the lubricant in stem chamber 15 at the hydrostatic pressure of the sea.

Stem 33 extends through clutch chamber 16 and has an outer end 37 located on the exterior of bonnet 13b. Outer end 37 may be configured to receive a wheel for manual rotation. Alternately, outer end 37 may be shaped with sides configured for engagement by an ROV (remote operated vehicle) for subsea applications. A threaded retainer 39 secures stem 33 within bonnet 13b. Retainer 39 preferably has inner diameter seals (not shown) for sealing around stem 33 and outer diameter seals (not shown) for sealing to bonnet 13b.

Preferably a brake or clutch 41 is mounted to stem 33 for selectively preventing rotation of stem 33. In this embodiment, clutch 41 is located within clutch chamber 16 in bonnet 13b above stem chamber 15. Clutch chamber 16 may be in fluid communication with stem chamber 16. Alternately, a stem seal (not shown) may be located between stem chamber 15 and clutch chamber 16. Clutch 41 may be of a variety of types and is not limited to any one particular means. By way of illustration of the principle of the invention, for example, it might comprise two or more plates (not shown) with friction pads isolated from any lubricant located within clutch chamber 16. One of the plates is non rotatably mounted to bonnet 13b while the other plate is mounted to stem 33 for rotation therewith.

When clutch 41 is in the engaged position, an external force causes the plates (or other means) to engage each other to prevent rotation of stem 33. The force could be supplied by a electrical solenoid, from hydraulic fluid pressure, or from other devices. In this embodiment, a controller 43 mounted to the exterior of valve body 13 provides a signal or power via a passage 45 to clutch 41. The signal or power may be electrical in nature supplied via an electrical conductor for maintaining a solenoid in a closed position. Alternately, the clutch 41 could be actively engaged by hydraulic fluid pressure or power supplied through passage 45 from controller 43. In the absence of hydraulic fluid pressure, the plate on stem 33 would be free to rotate. Clutch 41 is biased to a released position, typically by a spring, which (in the illustrative example) pushes the plates of clutch 41 apart from each in the absence of the signal or power from controller 43. Controller 43 receives its power or signal from a source external to valve 11, which may be subsea or at the surface.

In operation, in this example, the fail-safe position is a closed position. Alternately, the fail-safe position could be an open position. Normally, fluid pressure will exist in flow passage 17 (FIG. 2). Assuming that valve 11 is in its normally open position, gate 21 will be in the lower position with its hole 23 aligned with flow passage 17, as shown in FIG. 2. Clutch 41 (FIG. 1) will be engaged in response to a signal or power from controller 43, preventing rotation of stem 33. Seat rings 19 will not form tight seals with either of the gate faces 25. Rather, fluid pressure in passage 17 will also exist within gate chamber 14. This fluid pressure creates a pressure differential across neck seal 32 that equals the difference between the hydrostatic pressure in stem chamber 15 and the flow line pressure in passage 17, which is normally higher. Neck 27 has a pressure area proportional to the inner diameter of seal 32. The force due to the higher fluid pressure in gate chamber 14 urges gate 21 upward toward the closed position of FIG. 1. This upward force is resisted by a downward force due to the hydrostatic pressure in stem chamber 15 plus the anti-rotation force on stem 33 exerted by clutch 41. Clutch 41 has sufficient energy to prevent stem 33 from rotating when valve 11 is utilized under its design conditions, thus holding gate 21 in the lower open position.

In the event that the signal to clutch 41 is lost or turned off, clutch 41 will release. The pressure area of neck 27 is calculated in this example so as to be able to move gate 21 to the closed position under a nominal selected pressure in flow passage 17 greater than the hydrostatic pressure in stem chamber 15. The low torque or friction of ball screw 35 enables closure to occur at a relatively low pressure differential across seal 32. In some cases, such as very deep subsea applications, with low pressure in flow passage 17, a supplemental return spring may be needed to assist in moving gate 21 to the closed position. As gate 21 moves upward to the closed position, stem 33 rotates, and one of the gate faces 25 will sealingly engage a downstream one of the seat rings 19 to close valve 11.

To open gate valves 11 from the closed position, the signal to clutch 41 must be absent, so that it is in a released position. Stem 33 is rotated either by an ROV, if subsea, or manually by a wheel if at the surface. Once open, a signal is supplied by controller 43 to cause clutch 41 to engage stem 33 and prevent rotation in the reverse direction.

The invention has significant advantages. The valve moves to a fail-safe position in the event that clutch holding power is lost, and thereby enables remote fail-safe operation of a mechanically actuated valve, whilst avoiding the need for relatively costly hydraulic actuators. In a subsea application, this additionally avoids the need for associated accumulation and umbilical supplies, both of which incur significant cost and technical disadvantages as water depth and step out from the shore line increase. It follows that a subsea system may be supplied in a form that requires minimal hardware (actuators and umbilical functions) in order to effect the necessary functionality, whilst requiring only simple ROV (or manual) intervention in order to restore the system to the 'normal' production mode of operation.

The cylindrical gate neck and its sealing engagement within the stem chamber prevent fluid from the flow line from contact with the interface between the stem and the gate. This allows a very low friction interface, such as a ball screw, to be utilized without being contaminated by contact with fluid in the flow line. The pressure area provided by the neck can be sized to provide an adequate fail-safe movement based entirely on the flowline pressure in most cases. A return spring may be unnecessary. Even if a return spring is utilized for deep water and low flow line pressures, it would be much smaller than the return springs utilized with hydraulic actuators of the prior art.

While the invention has been shown in only one of its forms, it should be apparent to those skilled in the art that it is not so limited but is susceptible to various changes without departing from the scope of the invention.

The invention claimed is:

1. A gate valve, comprising:
   a body having a gate chamber intersected by a flow passage and a stem chamber extending from the gate chamber;
   a gate carried within the gate chamber for movement between a closed position and an open position;
   the gate having a neck having a cylindrical outer diameter and extending into the stem chamber;
   a rotatable member;
   an interface between the rotatable member and the neck of the gate for effecting movement of the gate between the open and closed positions in response to rotation of the rotatable member;
   a seal that seals between the stem chamber and the neck, thereby preventing any fluid in the gate chamber from contacting the interface; wherein:
   the neck has a pressure area defined by the seal;
   fluid pressure within the gate chamber when the valve is in one position acts against the pressure area to exert a force on the gate urging the gate to the other position and thereby urging the rotatable member to rotate; and the gate valve further comprises:
   a clutch for selectively preventing rotation of the rotatable member.

2. The gate valve according to claim 1, wherein the rotatable member comprises a stem that extends through the stem chamber and out of the body.

3. The gate valve according to claim 2, wherein the stem is non-rising relative to the body.

4. The gate valve according to claim 1, wherein:
   the pressure area of the neck is selected to cause the gate to move to the closed position in response to a selected fluid pressure differential across the seal when the clutch is released.

5. The gate valve according to claim 1, further comprising:
   a controller that maintains the clutch in an engaged position in response to an externally applied signal; and
   wherein the controller releases the clutch if the signal ceases.

6. The gate valve according to claim 1, wherein the interface between the neck and the rotatable member comprises a ball screw device.

7. The gate valve according to claim 1, wherein:
   the neck has a cavity therein;
   the rotatable member extends into the cavity; and
   the interface comprises helical grooves on the rotatable member and in the cavity.

8. The gate valve according to claim 1, wherein:
   the gate has an upstream side adjacent one intersection of the flow passage with the gate chamber and a downstream side adjacent another intersection of the flow passage with the gate chamber; and
   the upstream and downstream sides are formed on a single slab.

9. The gate valve according to claim 1, wherein the neck has a length at least equal to a stroke length between the open and closed positions.

10. A gate valve having a body with a gate chamber intersected by a flow passage and a stem chamber extending from the gate chamber, a gate carried within the gate chamber, and a stem for causing linear movement of the gate between open and closed positions in response to rotation of the stem, the improvement comprising:
    a neck on the gate with a cavity therein and a cylindrical outer diameter, the neck extending into the stem chamber, the stem having an inner end extending into the cavity;
    an interface between the stem and the cavity in the neck, the interface having mating helical grooves; and
    a seal that seals between the stem chamber and the neck, thereby preventing any fluid in the gate chamber from contacting the interface;
    a clutch that engages the stem to selectively prevent rotation of the stem; and
    a controller that maintains the clutch in an engaged position in response to an externally applied signal;
    wherein the neck has a pressure area selected to cause the gate to move to a fail-safe position in response to a selected fluid pressure differential across the seal and in the event the signal ceases.

11. The gate valve according to claim 10, wherein the signal is supplied by hydraulic pressure.

12. The gate valve according to claim 10, wherein the stem has an outer end that extends to an exterior portion of the body for engagement by an operator to rotate the stem.

13. The gate valve according to claim 10, wherein the stem is fixed against linear movement along an axis of the stem relative to the body.

14. The gate valve according to claim 10, wherein the neck has a length at least equal to a stroke length of the gate between the open and closed positions.

15. A gate valve, comprising:
    a body having a gate chamber intersected by a flow passage and a stem chamber extending from the gate chamber;
    a gate carried within the gate chamber, the gate having a neck extending into the stem chamber, the neck having a cavity therein;
    a non-rising stem extending into the stem chamber and having an inner end located within the cavity in the neck, the stem having an outer end exterior of the body for rotating the stem;
    a ball screw interface between the neck and the stem for effecting movement of the gate between open and closed positions in response to rotation of the stem;
    a seal that seals between the stem chamber and the neck, thereby preventing any fluid in the gate chamber from contacting the interface; and
    a clutch that selectively prevents the stem from rotating in response to fluid pressure in the gate chamber while the gate is in the a normal operating position;
    wherein the neck has a pressure area selected to cause the gate to move to a fail-safe position in response to a selected fluid pressure differential across the seal and in the event the clutch is not in an engaged position.

16. The gate valve according to claim 15, further comprising:
    a controller that maintains the clutch in the engaged position in response to external power.

17. The gate valve according to claim 15, wherein the neck has a length at least equal to a stroke length of the gate between the open and closed positions.

* * * * *